US011873193B1

(12) United States Patent
Wei

(10) Patent No.: US 11,873,193 B1
(45) Date of Patent: Jan. 16, 2024

(54) ELEVATOR DOOR SYSTEMS WITH MINIMUM RUNNING CLEARANCE

(71) Applicant: Otis Elevator Company, Farmington, CT (US)

(72) Inventor: Wei Wei, Unionville, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/157,384

(22) Filed: Jan. 20, 2023

(51) Int. Cl.
*B66B 13/30* (2006.01)
*B66B 13/12* (2006.01)

(52) U.S. Cl.
CPC .................................... *B66B 13/30* (2013.01)

(58) Field of Classification Search
CPC ................................ B66B 13/12; B66B 13/30
See application file for complete search history.

(56) References Cited

FOREIGN PATENT DOCUMENTS

| | | | | | |
|---|---|---|---|---|---|
| CN | 104973489 | A | * 10/2015 | ............. | B66B 11/02 |
| DE | 102010019962 | A1 | * 11/2011 | ............. | B66B 13/30 |
| EP | 0448017 | A2 | * 9/1991 | | |
| WO | WO-2015049423 | A1 | * 4/2015 | ............. | B66B 13/08 |

OTHER PUBLICATIONS

Machine translation of DE 10 2010 019 962.*

* cited by examiner

*Primary Examiner* — Diem M Tran
(74) *Attorney, Agent, or Firm* — CANTOR COLBURN LLP

(57) ABSTRACT

Elevator systems include an elevator car configured to travel along an elevator shaft, the elevator car having a car door and a car sill. One or more landings are arranged along the elevator shaft, the landings each having a landing door and a landing sill. An elevator coupling is provided that includes a car door coupling operably coupled to the car door and a landing door coupling operably coupled to the landing door. The car door coupling and the landing door coupling are selectively operable to drive operation of the car door and the landing door simultaneously and a sill gap between the car sill and the landing sill is less than 25 mm.

18 Claims, 5 Drawing Sheets

ELEVATOR DOOR SYSTEMS WITH MINIMUM RUNNING CLEARANCE

BACKGROUND

The subject matter disclosed herein generally relates to elevator systems and, more particularly, to elevator door systems with minimum running clearance for operating elevator cars within an elevator shaft.

Elevator systems include sliding doors, both of the elevator car and at the landings. The elevator car will travel within an elevator shaft between landings where the sliding doors may be opened to allow ingress and egress of passengers to and from the elevator car.

SUMMARY

According to some embodiments, elevator systems are provided. The elevator systems include an elevator car configured to travel along an elevator shaft, the elevator car having a car door and a car sill, a landing arranged along the elevator shaft, the landing having a landing door and a landing sill, and an elevator coupling comprising a car door coupling operably coupled to the car door and a landing door coupling operably coupled to the landing door, wherein the car door coupling and the landing door coupling are selectively operable to drive operation of the car door and the landing door simultaneously, with a sill gap between the car sill and the landing sill is less than 25 mm.

In addition to one or more of the features described above, or as an alternative, further embodiments of the safety systems may include that the sill gap is 6 mm.

In addition to one or more of the features described above, or as an alternative, further embodiments of the safety systems may include that the car sill and the landing sill define a sill region, and the elevator coupling is arranged outside of the sill region.

In addition to one or more of the features described above, or as an alternative, further embodiments of the safety systems may include that the car door is suspended from a car door hanger and attached to the car sill and the landing door is suspended form a landing door hanger and attached to the landing sill.

In addition to one or more of the features described above, or as an alternative, further embodiments of the safety systems may include that the car door hanger comprises a hanger extension extending into the elevator shaft past an elevator car sidewall, and the car door coupling is attached to the hanger extension extending from the car door hanger.

In addition to one or more of the features described above, or as an alternative, further embodiments of the safety systems may include that the landing door hanger comprises a hanger extension extending into the elevator shaft past the elevator car sidewall, and the landing door coupling is attached to the hanger extension extending from the landing door hanger.

In addition to one or more of the features described above, or as an alternative, further embodiments of the safety systems may include that the elevator coupling is positioned within a space defined between an elevator car sidewall and a shaft wall of the elevator shaft.

In addition to one or more of the features described above, or as an alternative, further embodiments of the safety systems may include that the shaft wall is perpendicular to a wall of the elevator shaft having the landing door.

In addition to one or more of the features described above, or as an alternative, further embodiments of the safety systems may include a car door hanger to which the elevator car door is attached, a landing door hanger to which the landing door is attached, wherein each of the car door hanger and the landing door hanger are oriented parallel with the car door and the landing door, a first hanger extension extending from the car door hanger, the first hanger extension comprising an angled extension oriented in a direction away from the landing door and toward the elevator car and a support extension extending parallel to the car door hanger, and a second hanger extension extending from the landing door hanger, the second hanger extension comprising an angled extension oriented in a direction away from the elevator car and toward the landing door and a support extension extending parallel to the landing door hanger. The car door coupling is mounted on the support extension of the first hanger extension and the landing door coupling is mounted on the support extension of the second hanger extension.

According to some embodiments, elevator systems having an elevator car configured to travel along an elevator shaft, the elevator car having a car door and a car sill and a landing arranged along the elevator shaft, the landing having a landing door and a landing sill, are provided. The elevator systems include an elevator coupling comprising a car door coupling operably coupled to the car door and a landing door coupling operably coupled to the landing door, wherein the car door coupling and the landing door coupling are selectively operable to drive operation of the car door and the landing door simultaneously, wherein the car sill and the landing sill define a sill region, and the elevator coupling is arranged outside of the sill region.

In addition to one or more of the features described above, or as an alternative, further embodiments of the safety systems may include that the sill gap is less than 25 mm.

In addition to one or more of the features described above, or as an alternative, further embodiments of the safety systems may include that the sill gap is 6 mm.

In addition to one or more of the features described above, or as an alternative, further embodiments of the safety systems may include that the car door is suspended from a car door hanger and attached to the car sill and the landing door is suspended form a landing door hanger and attached to the landing sill.

In addition to one or more of the features described above, or as an alternative, further embodiments of the safety systems may include that the car door hanger comprises a hanger extension extending into the elevator shaft past an elevator car sidewall, and the car door coupling is attached to the hanger extension extending from the car door hanger.

In addition to one or more of the features described above, or as an alternative, further embodiments of the safety systems may include that the landing door hanger comprises a hanger extension extending into the elevator shaft past the elevator car sidewall, and the landing door coupling is attached to the hanger extension extending from the landing door hanger.

In addition to one or more of the features described above, or as an alternative, further embodiments of the safety systems may include that the elevator coupling is positioned within a space defined between an elevator car sidewall and a shaft wall of the elevator shaft.

In addition to one or more of the features described above, or as an alternative, further embodiments of the safety systems may include that the shaft wall is perpendicular to a wall of the elevator shaft having the landing door.

In addition to one or more of the features described above, or as an alternative, further embodiments of the safety systems may include a car door hanger to which the elevator car door is attached, a landing door hanger to which the landing door is attached, wherein each of the car door hanger and the landing door hanger are oriented parallel with the car door and the landing door, a first hanger extension extending from the car door hanger, the first hanger extension comprising an angled extension oriented in a direction away from the landing door and toward the elevator car and a support extension extending parallel to the car door hanger, and a second hanger extension extending from the landing door hanger, the second hanger extension comprising an angled extension oriented in a direction away from the elevator car and toward the landing door and a support extension extending parallel to the landing door hanger. The car door coupling is mounted on the support extension of the first hanger extension and the landing door coupling is mounted on the support extension of the second hanger extension.

The foregoing features and elements may be combined in various combinations without exclusivity, unless expressly indicated otherwise. Features which are described in the context of separate aspects and embodiments may be used together and/or be interchangeable. Similarly, features described in the context of a single embodiment may also be provided separately or in any suitable subcombination. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
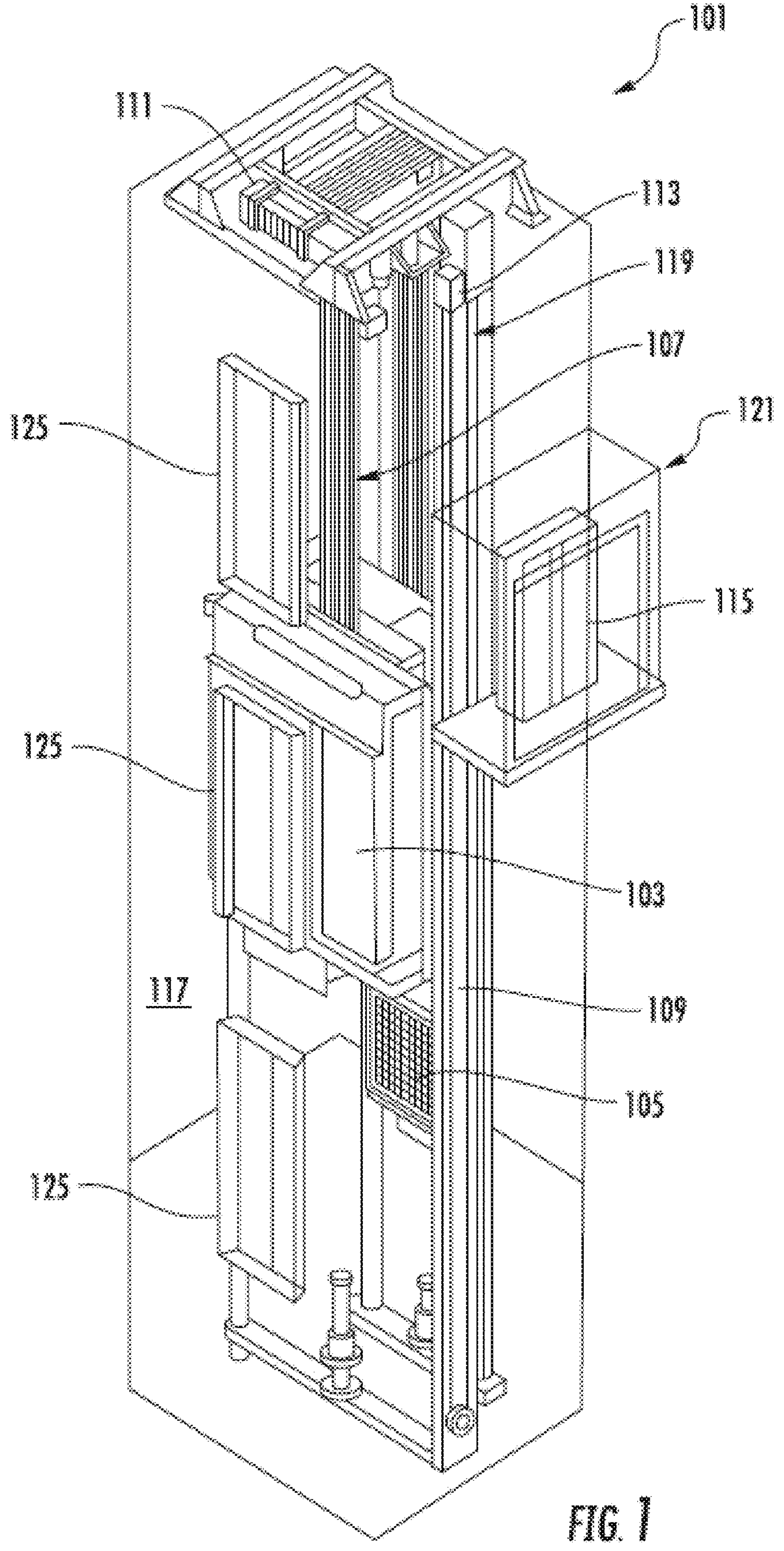
FIG. 1 is a schematic illustration of an elevator system that may employ various embodiments of the present disclosure.

FIG. 1 is a perspective view of an elevator system 101 including an elevator car 103, a counterweight 105, a roping 107, a guide rail 109, a machine 111, a position encoder 113, and an elevator controller 115. The elevator car 103 and counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The roping 107 engages the machine 111, which, in this illustrative embodiment, is part of an overhead structure of the elevator system 101, although other arrangements are possible without departing from the scope of the present disclosure. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The elevator controller 115 is located, as shown in the illustrative arrangement, in a controller room 121 of the elevator shaft 117 and is configured to control the operation of the elevator system 101, and particularly the elevator car 103. In other embodiments the controller 115 can be located in other locations, including, but not limited to, fixed to a landing or landing door or located in a cabinet at a landing. The elevator controller 115 may provide drive signals to the machine 111 to control the acceleration, deceleration, leveling, stopping, etc. of the elevator car 103. The elevator controller 115 may also be configured to receive position signals from the position encoder 113. When moving up or down within the elevator shaft 117 along guide rail 109, the elevator car 103 may stop at one or more landings 125 as controlled by the elevator controller 115. Although shown in a controller room 121, those of skill in the art will appreciate that the elevator controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. Although shown and described with a roping system, elevator systems that employ other methods and mechanisms of moving an elevator car within an elevator shaft may employ embodiments of the present disclosure. FIG. 1 is merely a non-limiting example presented for illustrative and explanatory purposes.

Figure 2:
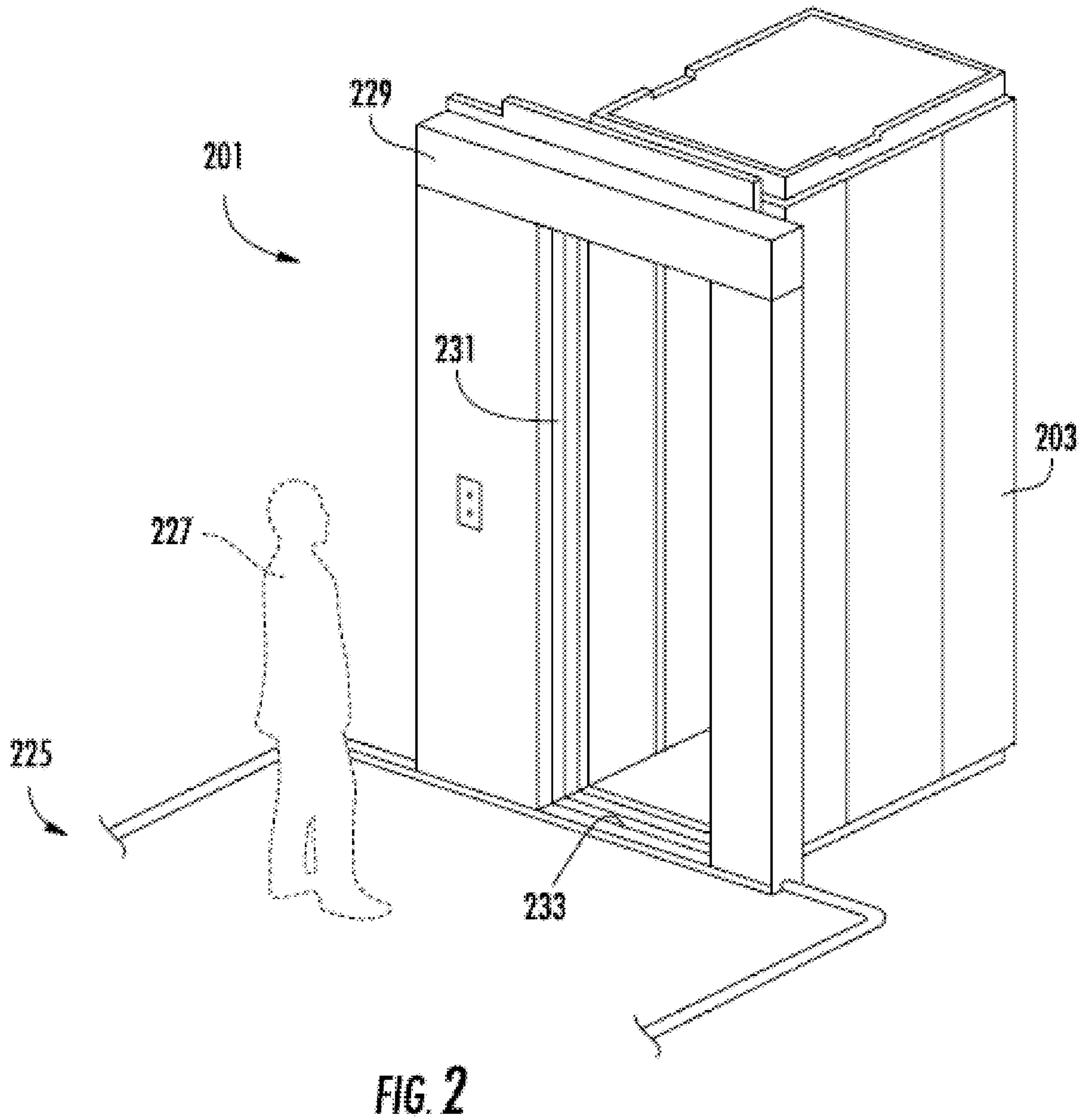
FIG. 2 is a schematic illustration of a landing floor of an elevator system that may employ various embodiments of the present disclosure.

FIG. 2 is a schematic illustration of an elevator system 201 that may incorporate embodiments disclosed herein. As shown in FIG. 2, an elevator car 203 is located at a landing 225. The elevator car 203 may be called to the landing 225 by a passenger or mechanic 227 that desires to travel to another floor within a building or perform maintenance on a portion of the elevator system 201. A door lock can be provided in a landing door lintel 229 of the elevator system 201 (which may be located at one or more landings 225). The door lock in the landing door lintel 229 can be used to securely lock a landing door 231 to prevent unauthorized access to an elevator shaft. The landing door 231 is arranged to slide open and close along an elevator sill 233. The elevator sill 233 may include a landing door sill of the landing door 231 and an elevator car door sill of the elevator car 203. The sills of the elevator sill 233 may include a guide, groove, or similar structure that is arranged to receive part of the respective landing door 231 or elevator car door to guide operation of the respective door. Typically, a gap is present between the sills of the elevator sill 233, between the sill of the landing door and the sill of the car door.

An elevator running clearance is a distance between the landing door sill and a sill of the elevator car. The elevator running clearance is set to ensure a safe clearance for the elevator car running in the hoistway. A typical running clearance is 30 mm. The running clearance is set to ensure that components of the elevator car do not contact with components that are fixed within the elevator shaft, such as landing door coupling mechanisms. However, such a running clearance (e.g., 30 mm) may result in safety concerns and/or other losses to passengers, such as a shoe heel jammed, valuable items dropped through the gap of the running clearance, or a large piece falling into the hoistway.

Accordingly, embodiments of the present disclosure are directed to reducing the size of the running clearance, thus provide a significantly smaller gap between the landing door sill and the elevator car sill, such that it is more difficult for a passenger to get stuck in the gap (e.g., heel of shoe) or drop an item through the gap. In accordance with embodiments of the present disclosure, the car door coupling and landing door lock are moved to an area beyond the sill area toward the side wall of the elevator shaft. In accordance with some embodiments, a redesign of the conventional coupling and lock mechanisms may be provided to narrow a thickness, space, or volume occupied by the respective mechanisms. Thus, in operation, when the elevator car runs along the elevator shaft, the car door coupling will not hit the landing sill even beyond a landing sill line. Further, the landing door lock roller may not hit the car line even when the roller extends beyond the car sill line. In accordance with some embodiments, and without limitation, a running clearance may be minimized or reduced from the conventional 30 mm gap to a gap of less than 25 mm, or even 10 mm or less, or even 6 mm, which may be nearly invisible to the naked eye. The minimized running clearance may prevent any jams, or drop risks, and reduce a building space requirement while improving an aesthetic of the elevator system.

Figure 3B:
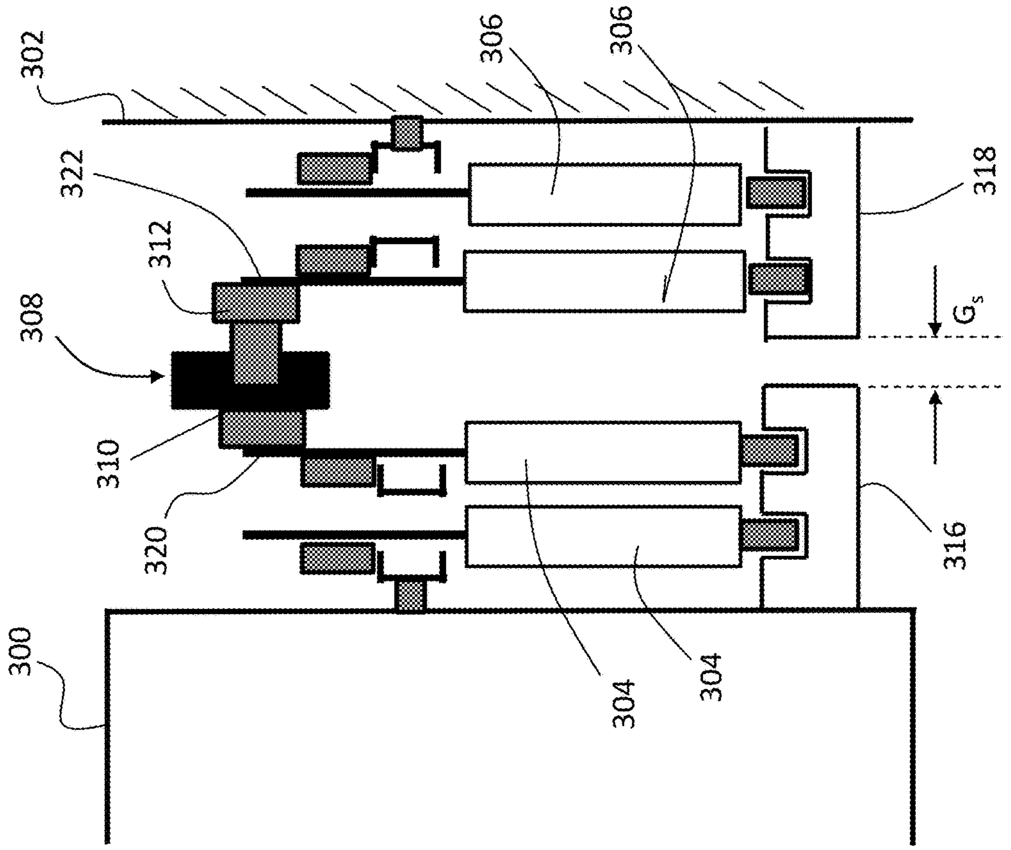
FIG. 3B Prior Art
FIG. 3B is a side elevation schematic view of the configuration of FIG. 3A.
Figure 3A:
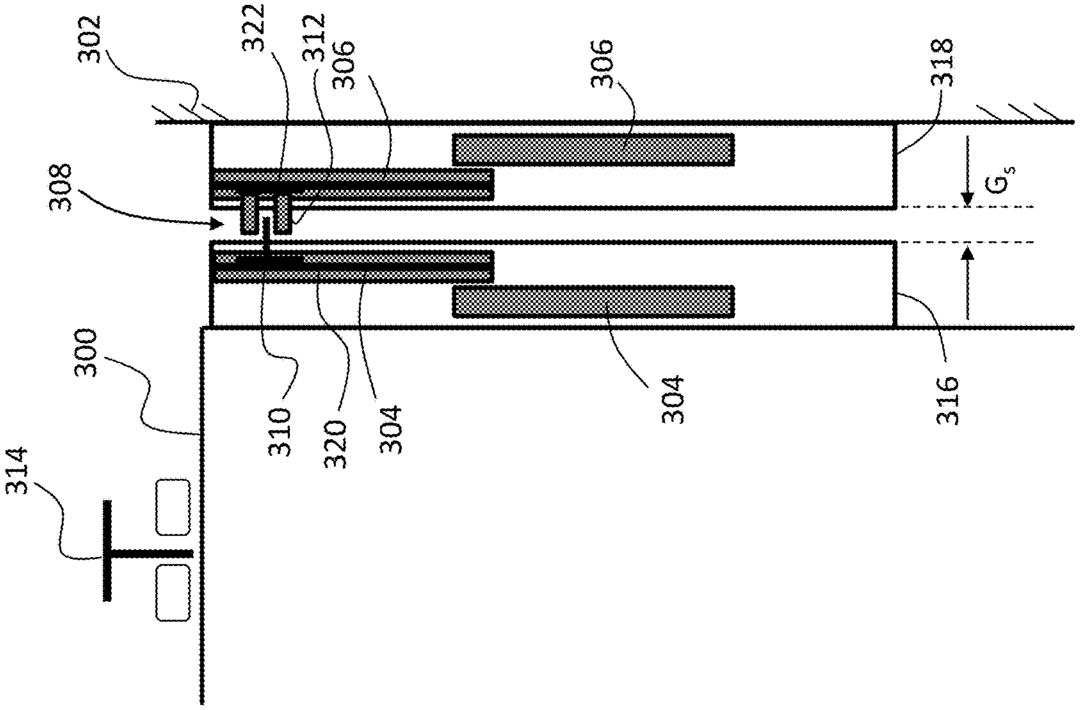
FIG. 3A Prior Art
FIG. 3A is a schematic illustration of a part of a conventional elevator system, illustrating a top down view.

Referring now to FIGS. 3A-3B, schematic illustrations of a conventional elevator system are shown. FIG. 3A is a top down view of an elevator car 300 arranged adjacent a landing 302, with elevator car doors 304 aligned with landing doors 306 and arranged for operation thereof through an elevator coupling 308. FIG. 3B is a side elevation schematic view of the configuration shown in FIG. 3A. The elevator coupling 308 includes a car door coupling 310 and the landing doors 306 include a landing door coupling 312. The elevator car 300 is configured to travel along a guide rail 314 within an elevator shaft. When the elevator car 300 is traveling through the elevator shaft along the guide rail 314, the car door coupling 310 and the elevator car doors 304 must be separated from the landing doors 306 and the landing door coupling 312 by a gap or space sufficient to ensure no contact occurs during travel of the elevator car 300.

When the elevator car 300 stops at a landing (e.g., illustrative landing 302), the car door coupling 310 must align with the landing door coupling 312 to ensure engagement and operable coupling therebetween, to allow the elevator car doors 304 and the landing doors 306 to interact and open/close together. The car door coupling 310 and the landing door coupling 312 are arranged at a top (or bottom) of the elevator car 300 and are positioned above the doors 304, 306 and are configured to operate the doors 304, 306.

To ensure that no contact occurs between the elevator car 300 and components within the elevator shaft, the elevator system may be configured with a clearance gap between the sills of the elevator car 300 and the landings 302. For example, as shown, the elevator car 300 includes a car sill 316 and the landing 302 includes a landing sill 318. The sills 316, 318 may include tracks, slots, or the like, for receiving a portion of the respective doors 304, 306 to guide movement thereof. A sill gap $G_s$ is defined between the car sill 316 and the landing sill 318. In the conventional configuration shown in FIGS. 3A-3B, the sill gap $G_s$ may be set to be 30 mm in distance from the car sill 316 to the landing sill 318. This sill gap $G_s$ is set to ensure that the components of the elevator coupling 308 do not interfere with each other during travel of the elevator car 300 along the elevator shaft. However, such a gap (e.g., 30 mm sill gap $G_s$) may be large enough to allow for small objects to fit therein and cause a tripping or drop hazard to passengers of the elevator car 300.

As shown in FIGS. 3A-3B, the components of the elevator coupling 308 are arranged above the sills 316, 318, which may represent a sill zone. A sill zone of the elevator car 300 is defined by the car sill 316 and a sill zone of the landing 302 is defined by the landing sill 318. Conventionally, the components of the elevator coupling 308 are arranged in the sill zones. For example, as shown in FIGS. 3A-3B, the car door coupling 310 may be mounted on a car door hanger 320 and the landing door coupling 312 may be mounted on a landing door hanger 322. The door hangers 320, 322 may be physically attached to the respective doors 304, 306 or associated structures, such as the wall, sill, framing, or the like. The door hangers 320, 322 may be tracks or the like upon which the respective doors 304, 306 are suspended and are configured to travel along in a sliding fashion during operation.

In accordance with embodiments of the present disclosure, the sill gap is reduced in dimension, thus reducing the hazard posed by the sill gap. For example, in accordance with embodiments of the present disclosure, the sill gap may be reduced from the standard 30 mm gap to a gap of less than 25 mm, or 10 mm or less, or even 6 mm in dimension. To accommodate a reduction in the sill gap, embodiments of the present disclosure include an offset or adjusted position of the components of the elevator coupling. That is, rather than positioning the components of the elevator coupling above the elevator car or at a top of the car, and aligned over the doors, embodiments of the present disclosure are directed to elevator coupling system with the components arranged to the side of the elevator car.

Figure 4B:
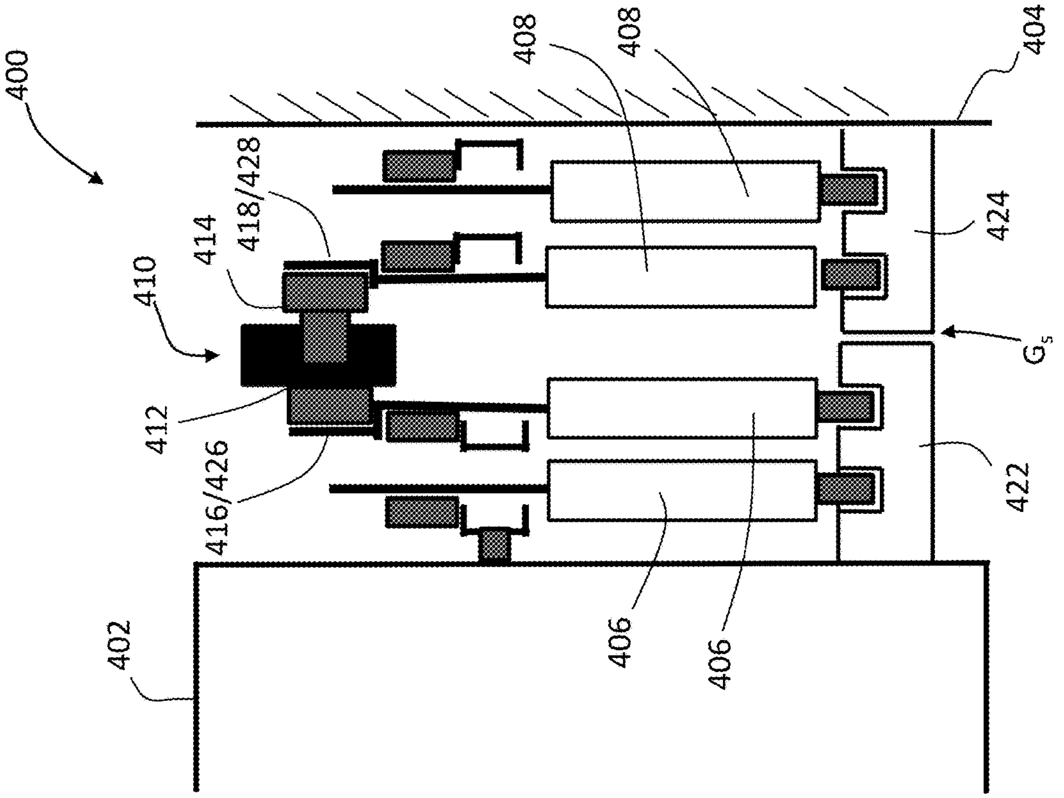
FIG. 4B is a side elevation schematic view of the configuration of FIG. 4A.
Figure 4A:
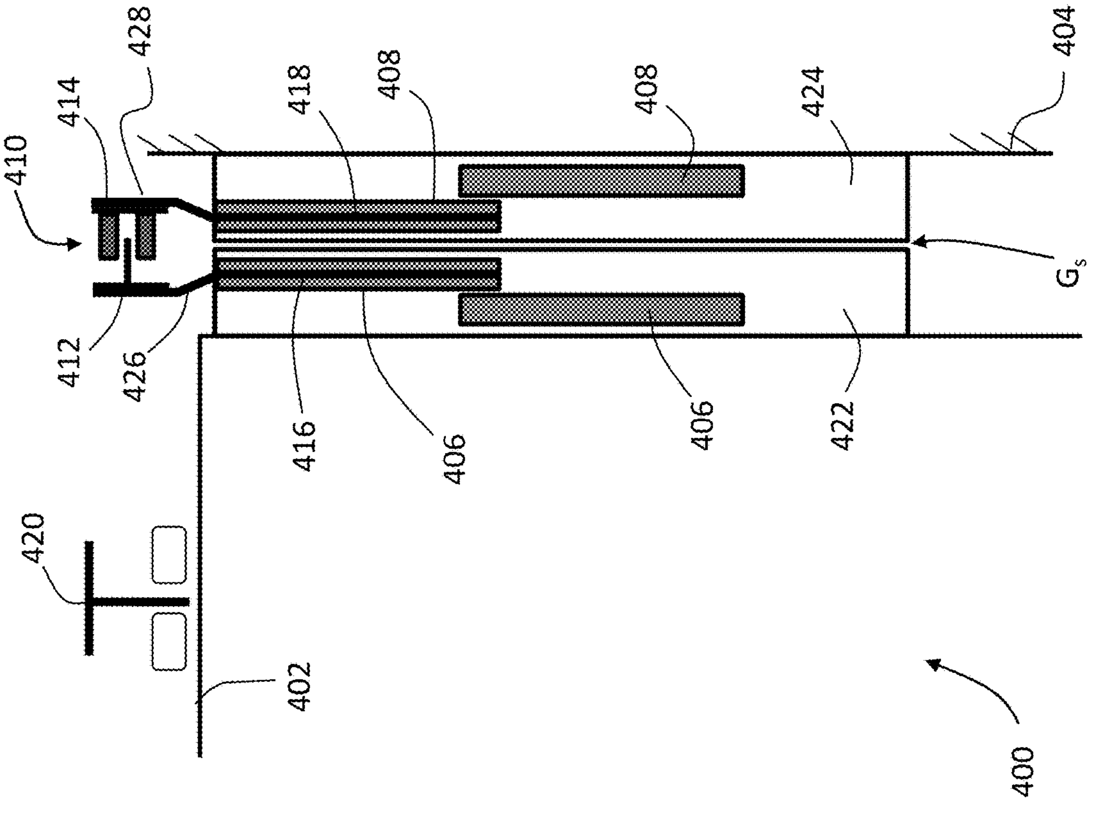
FIG. 4A is a schematic illustration of a part of an elevator system in accordance with an embodiment of the present disclosure, illustrating a top down view.

Referring now to FIGS. 4A-4B, schematic illustrations of an elevator system 400 in accordance with an embodiment of the present disclosure are shown. FIG. 4A is a top down view of an elevator car 402 arranged adjacent a landing 404. The elevator car 402 includes elevator car doors 406 that are shown aligned with landing doors 408 of the landing 404. An elevator coupling 410 is provided to enable operation of the elevator car doors 406 and the landing doors 408 simultaneously. FIG. 4B is a side elevation schematic view of the configuration shown in FIG. 4A. The elevator coupling 410 includes a car door coupling 412 and the landing doors 408 include a landing door coupling 414. The elevator car 402 includes a car door hanger 416 to which the elevator car doors 406 and the car door coupling 412 are installed and the landing 404 includes a landing door hanger 418 to which the landing doors 408 and the landing door coupling 414 are installed.

The elevator car 402 is configured to travel along a guide rail 420 within an elevator shaft. When the elevator car 402 is traveling through the elevator shaft along the guide rail 420, the car door coupling 412 and the elevator car doors 406 must be separated from the landing doors 408 and the landing door coupling 414 by a gap or space sufficient to ensure no contact occurs during travel of the elevator car 402 through the elevator shaft. When the elevator car 402 stops at a landing (e.g., illustrative landing 404), the car door coupling 412 must align with the landing door coupling 414 to ensure engagement and operable coupling therebetween, to allow the elevator car doors 406 and the landing doors 408 to interact and open/close together. The car door coupling 412 and the landing door coupling 414 are arranged at a top (or bottom) of the elevator car 402 and are positioned above the doors 406, 408 and are configured to cause operation thereof.

At the base of the elevator car doors 406 is a car sill 422 and at the base of the landing door 408 is a landing sill 424. The sills 422, 424 may include tracks or rails for guiding operation of the respective doors 406, 408. Similar to the embodiment of FIGS. 3A-3B, a sill gap $G_s$ is provided between the car sill 422 and the landing sill 424 to ensure that no contact occurs during travel of the elevator car 402 through the elevator shaft. In contrast to the embodiment shown in FIGS. 3A-3B, the sill gap $G_s$ of this configuration is reduced in dimension (e.g., a smaller gap). For example, the sill gap $G_s$ of the elevator system 400 may be a gap of less than 25 mm, or 10 mm or less, or even 6 mm in dimension. This smaller sill gap $G_s$ may prevent items from getting stuck between the sills 422, 424 or items falling through the sill gap $G_s$.

Because of the reduced sill gap $G_s$, the positioning of the elevator coupling 410 may be adjusted to accommodate such a reduced space between the elevator car 402 and the landing 404. As shown in FIG. 4A, the elevator coupling 410 is moved in position to a side of the elevator car 402 and thus the elevator coupling 410 is not aligned over either car sill 422 or the landing sill 424. In this configuration, the components of the elevator coupling 410 are mounted on hanger extensions 426, 428 of the hangers 416, 418. The hanger extensions 426, 428 extend outward from a side of the elevator car 402 (or landing 402) within the elevator shaft. A car door hanger extension 426 is provided on the elevator car 402 and offset from alignment over the car sill 422. That is, the car door hanger extension 426 extends outward from a vertical alignment over the car sill 422 and extends into the elevator shaft to the side of the elevator car 402. Similarly, a landing door hanger extension 428 is provided on the landing 404 and offset from alignment over the landing sill 424. That is, the landing door hanger extension 428 extends outward from a vertical alignment over the landing sill 424 and extends into the elevator shaft to the side of the elevator car 402 and aligns with the offset car door hanger extension 426.

By providing the hanger extensions 426, 428, the components of the elevator coupling 410 may be moved to a position where the components are not positioned directly above or aligned vertically with sills 422, 424 of the elevator system 400. By moving these components out of the sill area, the sills 422, 424 may be moved closer together, thus reducing the size of the sill gap $G_s$.

Figure 5:
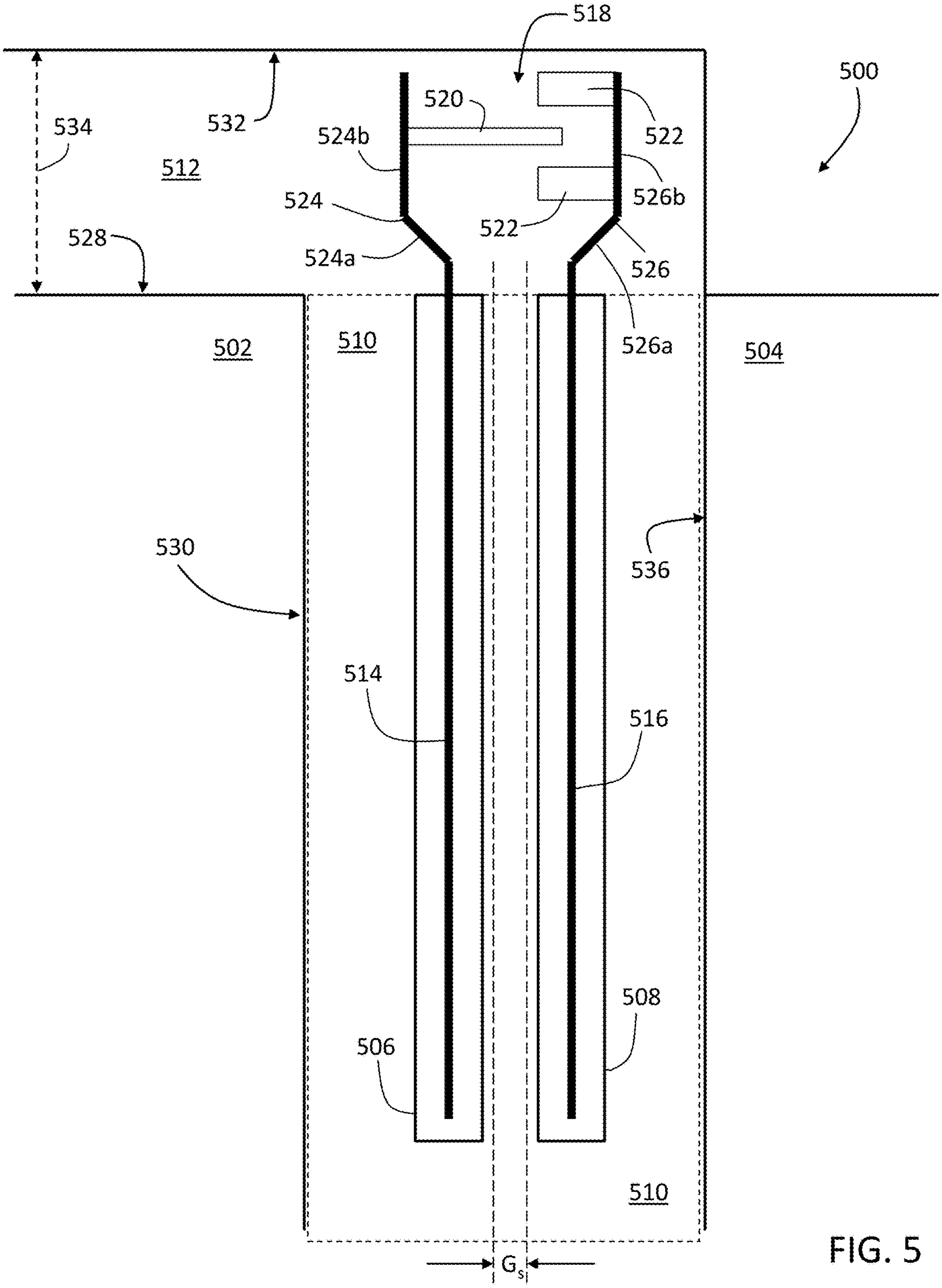
FIG. 5 is a schematic illustration of a part of an elevator system in accordance with an embodiment of the present disclosure.

Referring now to FIG. 5, a schematic illustration of a portion of an elevator system 500 in accordance with an embodiment of the present disclosure is shown. The elevator system 500 may be similar to that shown and described above with respect to FIGS. 4A-4B. The elevator system 500 includes an elevator car 502 arranged adjacent to a landing 504. In this illustration, the elevator car 502 includes an elevator car door 506 and the landing 504 includes a landing door 508. Although shown with a single door at each of the elevator car 502 and the landing 504, those of skill in the art will appreciate that one or more sliding or telescoping door or door panels may be provided without departing from the scope of the present disclosure.

The elevator car door 506 is arranged over and slidingly coupled to a respective car sill and the landing door 508 is arranged over and slidingly coupled to a respective landing sill. The car sill and the landing sill define a sill region 510 which includes the respective sills. The sill region 510 is define within an elevator shaft 512 between the elevator car 502 and the landing 504 and includes a sill gap $G_s$. The sill gap $G_s$ is a gap between the sill of the elevator car 502 and the sill of the landing 504, as described above. The doors 506, 508 are suspended within the sill region 510 by a respective elevator car door hanger 514 and a landing door hanger 516. The hangers 514, 516 are generally arranged within the sill region 510 to suspend or support the doors 506, 508 within the sill region 510 and guide operation of the respective doors 506, 508.

The operation of the doors 506, 508 is provided through engagement and operation of an elevator coupling 518 which includes a car door coupling 520 and a landing door coupling 522. The car door coupling 520 is configured to engage with the landing door coupling 522 to cause operation (e.g., opening/closing) of the doors 506, 508. To ensure a small sill gap $G_s$, the elevator coupling 518 is arranged to be positioned outside of the sill region 510. As shown, the car door coupling 520 is mounted to a car door hanger extension 524 and the landing door coupling 522 is mounted to a landing door hanger extension 526. The hanger extensions 524, 526 extend into the elevator shaft 512 beyond the sill region 510.

As shown in FIG. 5, the elevator car 502 has a sidewall 528 that is arranged perpendicular to a front side 530 of the elevator car 502 or perpendicular to an orientation or operational direction of the elevator car door 506. The sidewall 528 of the elevator car 502 may be spaced from a shaft wall 532 of the elevator shaft 512 by a separation distance 534. The separation distance 534 is defined, in part, by the space required for a guide rail and associated components on the elevator car 502. This space defined by the separation distance 534 within the elevator shaft 512 may accommodate the elevator coupling 518 as mounted on the hanger extensions 524, 526. That is, the elevator coupling 518 may be positioned in a space defined between the sidewall 528 of the elevator car 502 and the shaft wall 532 and outside of the sill region 510 which is defined between the front side 530 of the elevator car 502 and a landing wall 536. The shaft wall 532 may be a wall of the elevator shaft 512 that supports a guide rail of the elevator system. Stated another way, the shaft wall 532 that defines the separation distance 534 may be a wall of the elevator shaft 512 that is perpendicular to a wall of the elevator shaft having the landing door 508.

As shown in FIG. 5, the car door hanger extension 524 includes an angled extension **524*a* that extends in a direction toward the elevator car 502 and a support extension 524*b* that extends parallel to the car door hanger 514. Similarly, the landing door hanger extension 526 includes an angled extension 526*a* that extends in a direction toward the landing 504 and a support extension 526*b* that extends parallel to the landing door hanger 516. The angled extensions 524*a*, 526*a* are configured to ensure sufficient space is provided to accommodate the components of the respective coupling 520, 522, and the support extensions 524*b*, 526*b*** are provided to support the components of the respective couplings

520, 522 thereon. It will be appreciated that the length of the hanger extensions 524, 526 is less than the separation distance 534, and thus the components of the couplings 520, 522 will not contact the walls of the elevator shaft 512.

As provided herein, the coupling mechanisms for an elevator system may be adjusted in position within an elevator shaft to enable reducing a gap size of a sill gap. As discussed, a conventional gap is about 30 mm, which is sized to ensure no contact between an elevator car (or components thereof) and fixed components arranged in an elevator shaft (e.g., landing door components and the like). In accordance with embodiments of the present disclosure, the sill gap may be reduced to a gap size of less than 25 mm, or even 10 mm or less, or even 6 mm. This is achieved by moving the coupling components to be outside a sill region, and thus the sill gap may be optimized to be minimized, thus reducing risks or hazards associated with sill gaps. The position of the coupling components are moved outside of the sill region and into the elevator shaft offset from the elevator car. This allows for a reduced sill gap while maintaining operational functionality of the elevator car doors.

The reduced sill gap defines a running clearance of the elevator systems. That is, when the elevator car is traveling in an elevator shaft, past one or more landings, the gap between the sill of the elevator car and the sill of the landing may be reduced as compared to conventional sill gaps. A conventional sill gap is about 30 mm, which is selected to accommodate the components of the elevator car and the landing doors. The sill gap may be relatively large (e.g., 30 mm) because the elevator car doors, the landings doors, and the sills thereof that guide movement of the respective doors must have sufficient spacing to avoid collisions or contact between the components during travel. A minimum spacing of 6 mm between the sills is required to allow for vibrations and relative movement during travel. However, such a gap must be typically increased to 30 mm because of the size and required spacing for components of the coupling mechanisms. Advantageously, by moving the coupling mechanisms to be outside the sill region, the sill gap may be reduced to the minimum clearance, thus improving the safety and reducing the hazards associated with a larger sill gap.

Advantageously, embodiments provided herein provide for improved elevator systems with reduced hazards. In accordance with some embodiments, a sill gap is reduced by moving a position of elevator coupling mechanisms to be outside of a sill region, allowing minimizing of the gap present in the sill region. Further, by reducing the sill gap, the entire elevator system may be reduced in footprint and/or additional space within an elevator shaft may be realized. Additionally, an improved aesthetic may be provided by reducing the visible sill gap to be nearly invisible to the naked eye.

As used herein, the use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity).

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. An elevator system comprising:

an elevator car configured to travel along an elevator shaft, the elevator car having a car door and a car sill;

a landing arranged along the elevator shaft, the landing having a landing door and a landing sill; and an elevator coupling comprising a car door coupling operably coupled to the car door and a landing door coupling operably coupled to the landing door, wherein the car door coupling and the landing door coupling are selectively operable to drive operation of the car door and the landing door simultaneously, wherein a sill gap between the car sill and the landing sill is less than 20 mm.

2. The elevator system of claim 1, wherein the sill gap is 6 mm.

3. The elevator system of claim 1, wherein the car sill and the landing sill define a sill region, and the elevator coupling is arranged outside of the sill region.

4. The elevator system of claim 1, wherein the car door is suspended from a car door hanger and attached to the car sill and the landing door is suspended from a landing door hanger and attached to the landing sill.

5. The elevator system of claim 4, wherein the car door hanger comprises a hanger extension extending into the elevator shaft past an elevator car sidewall, and the car door coupling is attached to the hanger extension extending from the car door hanger.

6. The elevator system of claim 5, wherein the landing door hanger comprises a hanger extension extending into the elevator shaft past the elevator car sidewall, and the landing door coupling is attached to the hanger extension extending from the landing door hanger.

7. The elevator system of claim 1, wherein the elevator coupling is positioned within a space defined between an elevator car sidewall and a shaft wall of the elevator shaft.

8. The elevator system of claim 7, wherein the shaft wall is perpendicular to a wall of the elevator shaft having the landing door.

9. The elevator system of claim 1, further comprising:

a car door hanger to which the elevator car door is attached;

a landing door hanger to which the landing door is attached, wherein each of the car door hanger and the landing door hanger are oriented parallel with the car door and the landing door;

a first hanger extension extending from the car door hanger, the first hanger extension comprising an angled extension oriented in a direction away from the landing door and toward the elevator car and a support extension extending parallel to the car door hanger; and a second hanger extension extending from the landing door hanger, the second hanger extension comprising an angled extension oriented in a direction away from the elevator car and toward the landing door and a support extension extending parallel to the landing door hanger, wherein the car door coupling is mounted on the support extension of the first hanger extension and the landing door coupling is mounted on the support extension of the second hanger extension.

10. An elevator system comprising:

an elevator car configured to travel along an elevator shaft, the elevator car having a car door and a car sill;

a landing arranged along the elevator shaft, the landing having a landing door and a landing sill; and an elevator coupling comprising a car door coupling operably coupled to the car door and a landing door coupling operably coupled to the landing door, wherein the car door coupling and the landing door coupling are selectively operable to drive operation of the car door and the landing door simultaneously, wherein the car sill and the landing sill define a sill region, and the elevator coupling is arranged outside of the sill region, and wherein the elevator coupling is arranged in a space defined between a sidewall of the elevator car and a shaft wall of the elevator shaft, wherein the shaft wall is a wall of the elevator shaft that is perpendicular to a shaft wall having the landing door.

11. The elevator system of claim 10, wherein the sill gap is less than 20 mm.

12. The elevator system of claim 11, wherein the sill gap is 6 mm.

13. The elevator system of claim 10, wherein the car door is suspended from a car door hanger and attached to the car sill and the landing door is suspended from a landing door hanger and attached to the landing sill.

14. The elevator system of claim 13, wherein the car door hanger comprises a hanger extension extending into the elevator shaft past an elevator car sidewall, and the car door coupling is attached to the hanger extension extending from the car door hanger.

15. The elevator system of claim 14, wherein the landing door hanger comprises a hanger extension extending into the elevator shaft past the elevator car sidewall, and the landing door coupling is attached to the hanger extension extending from the landing door hanger.

16. The elevator system of claim 10, wherein the elevator coupling is positioned within a space defined between an elevator car sidewall and a shaft wall of the elevator shaft.

17. The elevator system of claim 16, wherein the shaft wall is perpendicular to a wall of the elevator shaft having the landing door.

18. The elevator system of claim 10, further comprising:

a car door hanger to which the elevator car door is attached;

a landing door hanger to which the landing door is attached, wherein each of the car door hanger and the landing door hanger are oriented parallel with the car door and the landing door;

a first hanger extension extending from the car door hanger, the first hanger extension comprising an angled extension oriented in a direction away from the landing door and toward the elevator car and a support extension extending parallel to the car door hanger; and a second hanger extension extending from the landing door hanger, the second hanger extension comprising an angled extension oriented in a direction away from the elevator car and toward the landing door and a support extension extending parallel to the landing door hanger, wherein the car door coupling is mounted on the support extension of the first hanger extension and the landing door coupling is mounted on the support extension of the second hanger extension.

* * * * *